United States Patent
Kuder et al.

[15] 3,691,223
[45] Sept. 12, 1972

[54] ETHER DIISOCYANATES

[72] Inventors: Robert C. Kuder, Excelsior, Minn. 55331; Marwan R. Kamal, Dhahran, Saudi Arabia

[73] Assignee: General Mills, Inc.

[22] Filed: April 25, 1969

[21] Appl. No.: 819,496

[52] U.S. Cl..................................260/453 AR, 260/77.5 AT, 260/453 AR, 260/465 F, 260/465.6, 260/584 B, 260/570.7
[51] Int. Cl.................................................C07c 119/04
[58] Field of Search..................260/453 AL, 453 AR

[56] References Cited

UNITED STATES PATENTS 3,144,468   8/1964   Hoover et al...............260/453

*Primary Examiner*—Joseph Rebold
*Assistant Examiner*—C. F. Warren
*Attorney*—Anthony A. Juettner, William C. Babcock and Gene O. Enockson

[57] ABSTRACT

Ether diisocyanates of the formulas:

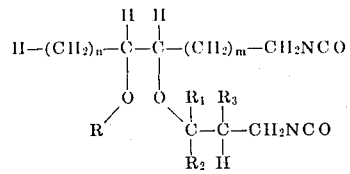

and

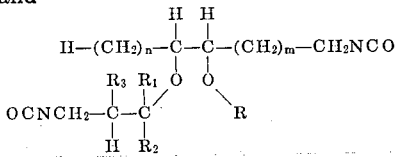

where $n$ is 4 to 19, $m$ is 0 to 15, the sum of $n$ and $m$ is 13 to 19, $R_1$, $R_2$ and $R_3$ are hydrogen or short chain alkyl groups of one to four carbon atoms and R is a monovalent organic radical. Polymers prepared from such diisocyanates and organic compounds containing active hydrogens.

8 Claims, No Drawings

ETHER DIISOCYANATES

The present invention relates to new ether diisocyanates. More particularly, it relates to such diisocyanates derived from diamines prepared by hydrogenating dinitriles ultimately obtained from monohydroxy compounds, certain fatty compounds and unsaturated nitriles. It also relates to polymers prepared from the ether diisocyanates and organic compounds containing two or more active hydrogens.

The new diisocyanates of the present invention have the structural formulas:

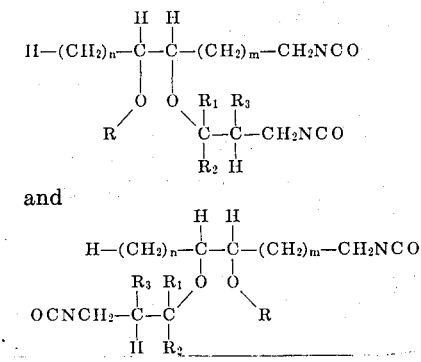

and where $n$ is 4 to 19, $m$ is 0 to 15, the sum of $n$ and $m$ is 13 to 19, $R_1$, $R_2$ and $R_3$ are hydrogen or short chain alkyl groups of one to four carbon atoms and R is a monovalent organic radical. The sum of the whole integers $m$ and $n$ is preferably 15. $R_1$—$R_3$ are preferably hydrogen and R is preferably a monovalent hydrocarbon radical of one to about 20 carbon atoms. Our new diisocyanates can be reacted with a wide variety of active hydrogen containing compounds to produce polymers including polyurethanes, polyureas, and the like. Such polymers are useful as coatings, sealants, adhesives, etc.

The diisocyanates of the invention are prepared by the reaction of the corresponding diamines with phosgene. In turn, the diamines are prepared by the hydrogenation of dinitriles. The said dinitriles are prepared by the reaction of a monohydroxy compound with an epoxy substituted fatty nitrile, followed by the reaction of the resulting product with an $\alpha,\beta$-unsaturated nitrile. Representative $\alpha,\beta$-unsaturated nitriles are acrylonitrile, methacrylonitrile and crotononitrile with the first being the preferred reactant.

The starting epoxy substituted fatty nitriles can be prepared in a number of known ways from monoethylenically unsaturated fatty nitriles of 16 to 22 carbon atoms. The preparation of the nitriles from the corresponding fatty acids and ammonia is also well known. This preparation and the conditions useful in the same are set forth in "Fatty Acids And Their Derivatives" by A. W. Ralston, 1948, pp. 620–625 (John Wiley & Sons, Inc.). The useful monoethylenically unsaturated aliphatic monobasic carboxylic acids which can be converted to the mono-nitriles and then to the starting epoxy substituted mono-nitriles can be represented by the following:

9-hexadecenoic (palmitoleic), 7-hexadecenoic, 2-hexadecenoic, 2-heptadeconoic, 2-octadecenoic, 3-octadecenoic, 4-octadecenoic, 5-octadecenoic, 6-octadecenoic (petroselinic), 7-octadecenoic, 8-octadecenoic, 9-octadecenoic (oleic, elaidic), 10-octadecenoic, 11-octadecenoic (vaccenic), 12-octadecenoic, 2-nonadecenoic, 9-eicosenoic (gadoleic), 11-eicosenoic, 13-docosenoic (erucic), 11-docosenoic (cetoleic), and the like. The oxidation of the mono-nitriles to the epoxy substituted nitriles is readily accomplished with mild oxidizing agents, preferably peracetic acid. The epoxy substituted nitriles can also be prepared according to the procedure of U.S. Pat. No. 2,756,242.

The epoxy substituted fatty nitrile is then converted to an ether and hydroxy substituted nitrile by reaction with a monohydroxy compound. Such reaction (or etherification) is preferably carried out in the presence of an acid catalyst. Sulfuric acid is one preferred catalyst. A wide variety of monohydroxy compounds can be utilized. Representative of such are: aliphatic alcohols including methanol, ethanol, propanol, isopropanol, butanol, pentanol, hexanol, octanol, 2-ethylhexanol, nonanol, decanol, dodecanol, hexadecanol, octadecanol, and the like; phenols such as phenol, p-nonyl phenol, o-cresol, other alkyl substituted phenols and the like; cycloaliphatic alcohols such as cyclohexanol, and alkyl substituted cyclohexanols, and aryl substituted aliphatic alcohols such as benzyl alcohol, and alkyl substituted benzyl alcohols. The alkyl substituents on the various classes of alcohols and phenols can be branched or straight chained and preferably contain from one to 12 carbon atoms. The monohydroxy compounds can also contain inert substituents such as Cl, nitro and the like but it is preferred that the resulting R group be unsubstituted hydrocarbon. The preferred monohydroxy compounds are the saturated aliphatic alcohols of one to about 18 carbon atoms.

The $\alpha,\beta$-unsaturated nitrile is condensed with the described ether and hydroxy substituted nitriles using an alkaline catalyst and moderate temperatures. A preferred catalyst is sodium ethoxide prepared by dissolving sodium in absolute ethanol. It is also preferred to use an excess of the unsaturated nitrile and temperatures of about 25° to 100° C. are preferred. The resulting product comprises a mixture of position isomers which can be separated if desired by chromatography and the like. However, there is ordinarily no reason to do so since the compounds are functionally equivalent.

The described dinitriles are then converted to diamines by hydrogenation. The hydrogenation is carried out in the presence of ammonia utilizing a hydrogenation catalyst such as Raney cobalt or Raney nickel.

The diamines are converted to the diisocyanates of the present invention by the conventional procedure of reacting phosgene therewith and then decomposing the intermediate carbamyl chlorides by raising the reaction temperature. The reaction is preferably carried out in an organic solvent such as toluene.

The following Examples A-F are illustrative of the preparation of the dinitriles without being limiting.

EXAMPLE A

A mixture of 279 g. of 9,10-epoxystearonitrile, 1,000 ml. of methanol, and 2 g. of concentrated sulfuric acid was refluxed for two hours. About 600 ml. of the methanol was then distilled off, and the remainder of the reaction mixture was poured into water. The oil layer was taken up in hexane, the hexane extract washed with salt water, and the hexane stripped off on a rotary evaporator, leaving 298 g. crude methoxyhydroxystearonitrile. On vacuum-distillation of the crude product, 82 percent was obtained as a light yellow liquid boiling at 160±4° C. at 0.07 mm. Hg.

To 145 g. of the above distilled methoxyhydroxystearonitrile were added 2 ml. of sodium ethoxide catalyst solution (made by dissolving 0.5 g. sodium in 10 g. absolute alcohol) and 20.6 g. acrylonitrile. The mixture was held at about 60° C. for 3 hours. Then another 2 ml. catalyst solution and 21.8 g. acrylonitrile were added and heating was continued at about 60° C. for another 3 hours. The reaction mixture was then diluted with hexane, filtered and washed to remove the catalyst. Evaporation of the hexane left 161 g. crude methoxy-(cyanoethoxy)-stearonitrile. On vacuum-distillation of the crude product, 69 percent was obtained as a yellow liquid boiling mostly at 180°–190° C. at 0.08 mm. Hg. and containing 7.50 percent nitrogen. The product comprised a mixture of 9-methoxy-10-($\beta$-cyanoethoxy)stearonitrile and 10-methoxy-9-($\beta$-cyanoethoxy)stearonitrile having the formulas:

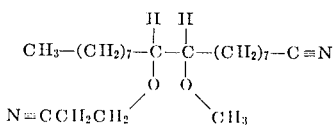

and

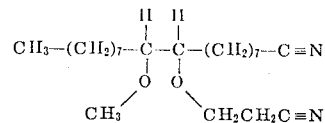

EXAMPLE B

Butoxy-(cyanoethoxy)-stearonitrile was prepared in essentially the same manner as set forth in Example A using n-butanol in place of methanol. The product comprised a mixture of 9-butoxy-10-($\beta$-cyanoethoxy)stearonitrile and 10-butoxy-9-($\beta$-cyanoethoxy)stearonitrile having the formulas:

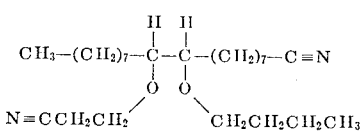

and

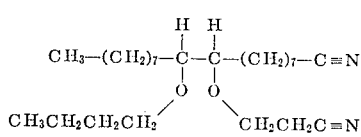

EXAMPLE C

Octyloxy-(cyanoethoxy)-stearonitrile was prepared in essentially the same manner as set forth in Example A using n-octyl alcohol in place of methanol. The product comprised a mixture of 9-octyloxy-10-($\beta$-cyanoethoxy)stearonitrile and 10-octyloxy-9-($\beta$-cyanoethoxy)stearonitrile having the formulas:

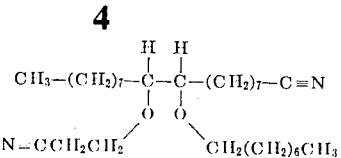

and

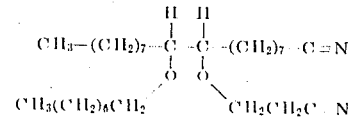

EXAMPLE D

Cetyloxy-(cyanoethoxy)-stearonitrile was prepared in essentially the same manner as set forth in Example A using cetyl alcohol (n-hexadecyl alcohol) in place of methanol. The product comprised a mixture of 9-cetyloxy-10-($\beta$-cyanoethoxy) stearonitrile and 10-cetyloxy-9-($\beta$-cyanoethoxy)stearonitrile having the formulas:

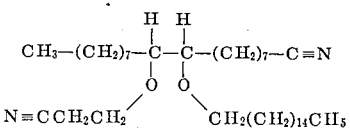

and

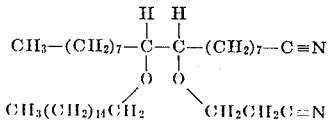

EXAMPLE E

Example A is essentially repeated using 9,10-epoxypalmitonitrile. The resulting 9-methoxy-10-($\beta$-cyanoethoxy)-palmitonitrile and 10-methoxy-9-($\beta$-cyanoethoxy)-palmitonitrile have the formulas:

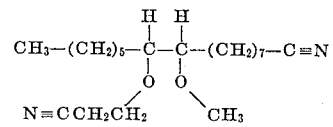

and

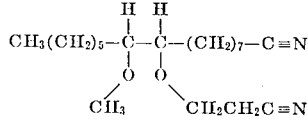

EXAMPLE F

Example A is essentially repeated using phenol in place of methanol. The resulting 9-phenoxy-10-($\beta$-cyanoethoxy)-stearonitrile and 10-phenoxy-9-($\beta$-cyanoethoxy)-stearonitrile have the formulas:

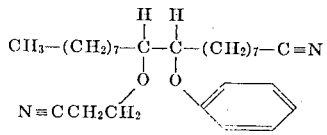

and

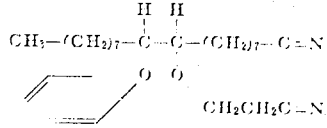

The following examples are illustrative of the preparation of the diamines without being limiting.

EXAMPLE G

A mixture of 175 g. distilled methoxy-(cyanoethoxy)-stearonitrile as prepared in Example A, 175 g. methanol, 26.5 g. Raney cobalt catalyst, and 150 ml. liquid ammonia was heated at 145°–150° C. in a stirred autoclave under a pressure of 860–1,550 psi of hydrogen until uptake of hydrogen ceased (about 3 hours). The catalyst was then filtered off and the ammonia and methanol stripped out under vacuum, leaving 174 g. crude methoxy-(aminopropoxy)-stearyl amine. On vacuum distillation of the crude product, 95 percent was obtained as a colorless liquid boiling mostly at 170°–80° C. at 0.2 mm. Hg., with a nitrogen content of 6.94 percent and an amine number of 282. The product comprised a mixture of 9-methoxy-10-(γ-aminopropoxy)-stearyl amine and 10-methoxy-9-(γ-amino-propoxy)-stearyl amine having the formulas:

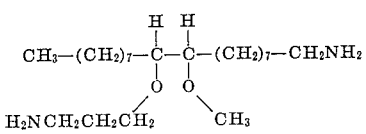

and

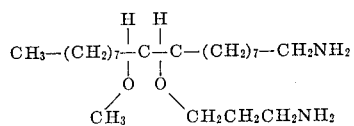

Such mixture of position isomers can be separated (as well as the isomers of the examples to follow) such as by chromatography. However, there is ordinarily no reason to do so since the compounds are functionally equivalent.

EXAMPLE H

Example G was essentially repeated using the dinitrile of Example B. The resulting product comprised a mixture of 9-butoxy-10-(γ-aminopropoxy)-stearyl amine and 10-butoxy-9-(γ-aminopropoxy)-stearyl amine having the formulas:

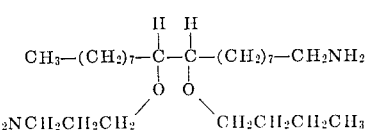

and

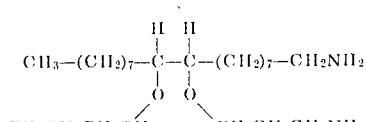

EXAMPLE J

Example G was essentially repeated using the dinitrile of Example C. The resulting product comprised a mixture of 9-octyloxy-10-(γ-aminopropoxy)-stearyl amine and 10-octyloxy-9-(γ-aminopropoxy)-stearyl amine having the formulas:

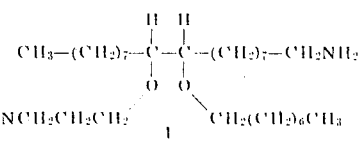

and

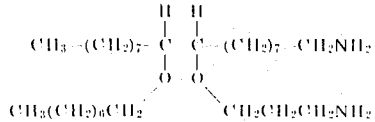

EXAMPLE K

Example G was essentially repeated using the dinitrile of Example D. The resulting product comprised a mixture of 9-cetyloxy-10-(γ-aminopropoxy)-stearyl amine and 10-cetyloxy-9-(γ-aminopropoxy)-stearyl amine having the formulas:

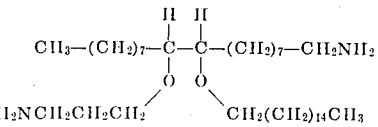

and

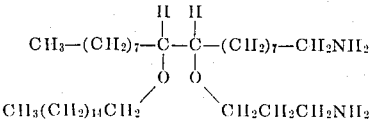

EXAMPLE L

Example G is essentially repeated using the dinitrile of Example E. The resulting product comprises a mixture of 9-methoxy-10-(γ-aminopropoxy)-palmityl amine and 10-methoxy-9-(γ-aminopropoxy)-palmityl amine having the formulas:

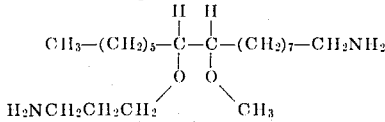

and

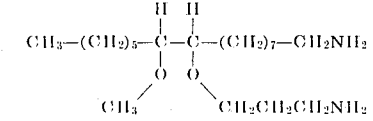

EXAMPLE M

Example G is essentially repeated using the dinitrile of Example F. The resulting product comprises a mixture of 9-phenoxy-10-(γ-aminopropoxy)-stearyl amine and 10-phenoxy-9-(γ-aminopropoxy)-stearyl amine having the formulas: (i.e.

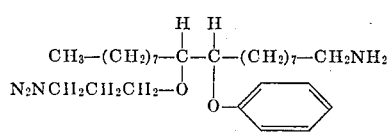

and

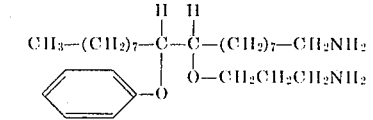

The following examples are illustrative of the preparation of the diisocyanates of the invention without being limiting.

EXAMPLE I

A solution of 100 g. distilled methoxy-(γ-aminopropoxyl)-stearyl amine as prepared in Example G in 200 g. dry toluene was added over a 60 minute period to a solution of 397 g. phosgene in 800 g. dry toluene. The temperature of the reaction mixture increased from 15° to 30° C. during this time. The temperature was then increased to 50° C. over a two-hour period, while any phosgene which boiled out was returned to the reaction mixture by means of a reflux condenser. The excess phosgene was then removed by blowing the reaction mixture with a stream of nitrogen while raising the temperature to 110° C. About one-half of the toluene was then distilled off at atmospheric pressure and the rest removed under vacuum in a rotary evaporator, leaving 101 g. crude methoxy-(isocyanato-propoxy)-stearyl isocyanate. On distilling the crude product through a falling-film molecular still 80 percent was collected as distillate ($N_D^{27}$ 1.461) at jacket temperatures of 150°–200° C. and a pressure of about 0.2 mm. Hg. The product was a mixture of 9-methoxy-10-(γ-isocyanatopropoxy)-stearyl isocyanate and 10-methoxy-9-(γ-isocyanatopropoxy)-stearyl isocyanate having the formulas:

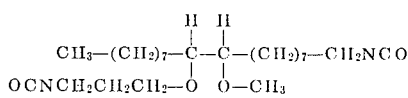

and

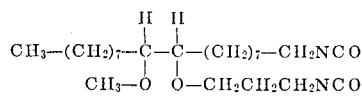

Such mixture of position isomers can be separated (as well as the isomers of the examples to follow) such as by chromatography. However, there is ordinarily no reason to do so since the compounds are functionally equivalent.

EXAMPLE II

Example I was essentially repeated using the diamine of Example H. The resulting product comprised a mixture of 9-butoxy-10-(γ-isocyanatopropoxy)-stearyl isocyanate and 10-butoxy-9-(γ-isocyanatopropoxy)-stearyl isocyanate having the formulas:

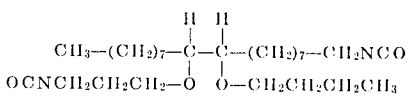

and

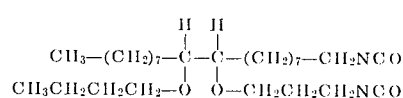

EXAMPLE III

Example I was essentially repeated using the diamine of Example J. The resulting product comprised a mixture of 9-octyloxy-10-(γ-isocyanatopropoxy)-stearyl isocyanate and 10-octyloxy-9-(γ-isocyanatopropoxy)-stearyl isocyanate having the formulas:

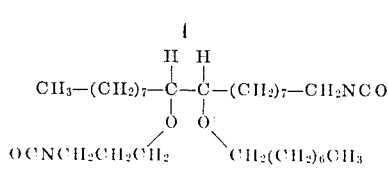

and

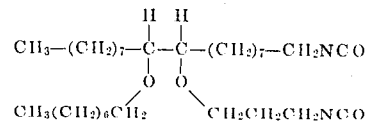

EXAMPLE IV

Example I was essentially repeated using the diamine of Example K. The resulting product comprised a mixture of 9-cetyloxy-10-(γ-isocyanatopropoxy)-stearyl isocyanate and 10-cetyloxy-9-(γ-isocyanatopropoxy)-stearyl isocyanate having the formulas:

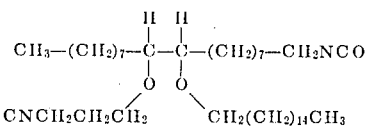

and

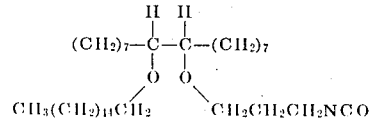

EXAMPLE V

Example I is essentially repeated using the diamine of Example L. The resulting product comprises a mixture of 9-methoxy-10-(γ-isocyanatopropoxy)-palmityl isocyanate and 10-methoxy-9-(γ-isocyanatopropoxy)-palmityl isocyanate having the formulas:

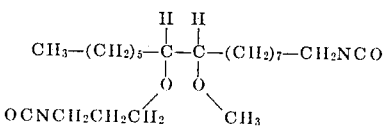

and

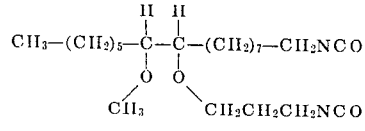

EXAMPLE VI

Example I is essentially repeated using the diamine of Example M. The resulting product comprises a mixture of 9-phenoxy-10-(γ-isocyanatopropoxy)-stearyl isocyanate and 10-phenoxy-9-(γ-isocyanatopropoxy)-stearyl isocyanate having the formulas:

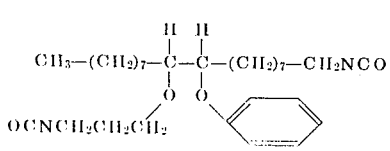

and

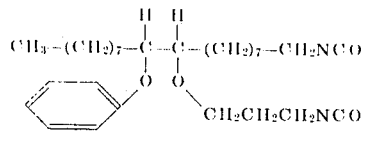

As indicated above, our new diisocyanates are particularly valuable for the preparation of polymers by reaction with compounds bearing at least two active hydrogen atoms as determined by the Zerewitinoff method. The Zerewitinoff test is described by Kohler in J. Am. Chem. Soc., 49, 3181 (1927). Such polymers are useful especially as coatings for a variety of substrates.

In general, the active hydrogen atoms of compounds reactive with our new diisocyanates are attached to carbon, oxygen, nitrogen or sulfur atoms. Compounds containing the following groups will have active hydrogen atoms: primary amino, secondary amino, carboxyl, diazoamino, hydrozino, hydrozo, hydrozono, hydroxyamino, hydroxyl imido, imino and mercapto. Most often these active hydrogen atoms are attached to oxygen, nitrogen, or sulfur atoms; thus they will be a part of groups such as —OH, —SH, —NH—, —NH$_2$, —CO$_2$H, —CONH$_2$, —CONHR where R represents an organic radical, —SO$_2$OH, —SO$_2$NH$_2$, and —CSNH$_2$. Examples of suitable types of compounds include water, hydrogen sulfide, ammonia, hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thios having two or more —SH groups; polyamines including both aromatic, aliphatic and heterocyclic diamines, triamine, tetramines and the like; as well as mixtures thereof. Of course, compounds which contain two or more different groups within the above-defined classes may also be used in accordance with the present invention such as, for example, amino alcohols which contain an amino group and a hydroxyl group, amino alcohols which contain two amino groups and one hydroxyl group, aminoacids and the like. Further illustrative classes and specific organic compounds containing active hydrogen atoms useful for preparing polymers according to our invention are described immediately hereinbelow.

Any suitable polyester may be used and may contain terminal hydroxyl groups, terminal carboxylic acid groups, amino groups or the like. Moreover, the polyester may be a polyester amide which was prepared by condensing an amino alcohol containing both free amino groups and free hydroxyl groups with the other components used in the preparation of polyesters. The polyester may be prepared by reacting a polycarboxylic acid or hydroxy carboxylic acid with polyhydric alcohols. It is also possible to use a mixture of polyhydric alcohols and polyamines such as ethylenediamine, polyethylenediamine, 1,4-butylenediamine and the like. Amines such as bis-(2-aminoethyl)ether or amino carboxylic acids such as glycine, alanien, valine, phenylalanine, hydroxyproline and the like may also be used. The polyesters may contain hetero atoms in addition to the ester groups including oxygen, sulfur, nitrogen and the like in the chain. Moreover, the radicals making up the polyester may be either saturated or unsaturated and may contain double or triple bonds as well as modifying radicals of saturated or unsaturated fatty acids such as oleic acid or fatty alcohols such as aleyl alcohol and the like.

Any suitable polycarboxylic acid may be used in the preparation of the polyesters such as, for example, oxalic acid, malonic acid, succinic acid, glutaric acid, adipic acid, pimelic acid, suberic acid, azelaic acid, sebacic acid, brassylic acid, maleic acid, fumaric acid, glutaconic acid, alpha-hydromuconic acid, beta-hydromuconic acid, alpha-butyl-alpha-ethyl-glutaric acid, alpha,beta-diethyl-succinic acid, isophthalic acid, terephthalic acid, hemimellitic acid, trimellitic acid, tremesic acid, mellophanic acid, prehnitic acid, pyromellitic acid, benzenepentacarboxylic acid, 1,4-cyclohexanedicarboxylic acid, and the like. Any suitable polyhydric alcohol may be used in the preparation of the polyesters such as, for example, ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerine, trimethylolpropane, 1,3,6-hexanetriol, triethanolamine, pentaerythritol, sorbitol and the like.

Any suitable polyhydric polyalkylene ether may be used as the active hydrogen containing compound such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide, and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohols such as glycerine, trimethylolpropane, pentaerythritol and the like in the preparation of the polyhydric polyalkylene ethers so that some branching exists in the product. Generally speaking, it is advantageous to condense from about five to about 30 moles of alkylene oxide per functional group of the trihydric or higher polyhydric alcohol. The polyhydric polyalkylene ethers may be prepared by any known process such as, for example, the process disclosed in 1859 by Wurtz and in Encyclopedia of Chemical Technology, Volume 7, pages 257 to 262, published by Interscience Publishers, Inc. (1951), or in U.S. Pat. No. 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Pat. Nos. 2,862,972 and 2,900,368.

Any suitable polyhydric alcohol may be used as the active hydrogen containing compound such as, for example, alkane diols such as, for example, ethylene glycol, 1,3-propylene glycol, 1,2-propylene glycol, 1,4-butylene glycol, 1,3-butylene glycol, 1,5-pentanediol, 1,4-butanediol, 1,3-pentanediol, 1,6-hexanediol, 1,7-heptanediol, 2,2-dimethyl-1,3-propanediol, 1,8-octanediol and the like including 1,20-eicosanediol and the like; alkene diols such as, for example, 2-butene- 1,4-diol, 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as 4-hexene-1,3,6-triol and the like; alkyne triols such as 2-hexyne-1,4,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as for example, 2-butene-1,4-dithiol and the like; alkyne thiols such as, for example, 3-hexyne-1,6-dithiol and the like.

Any suitable polyamine may be used including, for example, aromatic polyamines such as, for example, p-amino aniline, 1,5-diamino naphthalene, 2,4-diaminotoluene, 1,3,5-benzene triamine, 1,2,3-benzene triamine, 1,4,5,8-naphthalene tetramine and the like; aliphatic polyamines such as, for example, ethylenediamine, 1,3-propylenediamine, 1,4-butylenediamine, 1,3-butylenediamine, diethylenetriamine, triethylenetetramine, 1,3,6-hexane triamine, 1,3,5,7-heptane tetramine and the like; heterocyclic polyamines such as for example, 2,6-diamino pyridine, 2,4-diamino-5-aminomethyl pyrimidine, 2,5-diamino-1,3,4-thiadiazole, piperazine and the like.

One especially preferred group of amines useful for preparing polymers according to our invention are polyamines having the primary amine groups thereof blocked by ketimine or aldimine groups. The reaction of carbonyl compounds with the primary amine groups can be illustrated as follows:

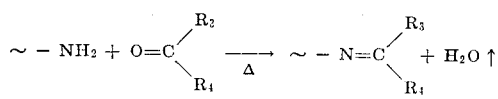

The useful carbonyl compounds may have the following theoretical structural formula:

where $R^3$ and $R^4$ are organic radicals, are each substantially inert to the ketimine or aldimine formation reaction and are preferably hydrogen or short chain alkyl groups (one to four carbon atoms). Preferred compounds are low molecular weight ($C_2$—$C_6$) aldehydes or ketones that are volatile so that an unreacted excess thereof may easily be removed by conventional distillation practices when the reaction is completed. Such volatile compounds are also preferred so that when the blocked polyamine is mixed with the new diisocyanate and exposed to moisture, the freed aldehyde or ketone can be easily removed from the reaction mixture. Examples of preferred carbonyl compounds include such aldehydes and ketones as acetone, methyl ethyl ketone, methyl n-butyl ketone, methyl tert-butyl ketone, ethyl isopropyl ketone, acetaldehyde, propionaldehyde, butyraldehyde, isobutyraldehyde, and the like i.e., including hexanone and hexanal). The polyamines to be blocked preferably have the structure

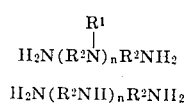

where $R^2$ is a difunctional aliphatic group containing from two to 48 carbon atoms, $R^1$ is an aliphatic group containing one to 24 carbon atoms and $n$ is an integer of from 0–20. Representative $R^1$ radicals are methyl, propyl, butyl, decyl, hexadecyl, hexenyl octenyl, tridecenyl, octadecyl, undecynyl and the like. Inert or non-interfering groups such as Cl, nitro and the like may be present on $R^1$ and/or $R^2$.

Any suitable reaction product of a phenol with an alkylene oxide yielding a compound containing active hydrogens may be used such as, for example, those disclosed in U.S. Pat. No. 2,843,568, such as for example, the reaction product of hydroquinone with ethylene oxide to give a polyalkylene arylene ether glycol having a molecular weight above about 750 or other polyalkylene arylene ether glycols disclosed in said patent.

Any suitable reaction product of a phenol-aldehyde resin with an alkylene oxide may be used such as, for example, a novolac having the formula

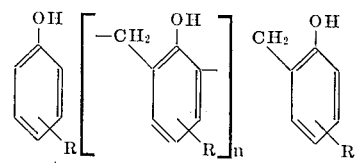

wherein $n$ is 1 to 5 and R is a lower alkyl radical such as methyl, ethyl, propyl, butyl, tertiary butyl and the like reacted with an alkylene oxide such as those disclosed above for the preparation of the polyhydric polyalkylene ethers.

Any suitable reaction product of an amine with an alkylene oxide may be used such as, for example, the reaction product of an alkylene oxide with a tolylenediamine such as, 2,4-tolylenediamine, 2,6-tolylenediamine or the like, a diphenylmethane diamine such as 4,4'-diaminodiphenylmethane or the like, xylene diamine, as well as alkylene diamines such as, for example, ethylenediamine, propylenediamine, 1,4-butylenediamine, hexamethylenediamine and the like including 1,10-dodecane diamine.

Any suitable phenol may be used such as, for example, 2,2-bis(p-hydroxyphenyl)propane (Bisphenol A) and the like.

Any suitable polyamide may be used such as, for example, those obtained by reacting adipic acid with hexamethylenediamine and the like.

Any suitable polyacetal may be used such as, for example, the reaction product of formaldehyde or other suitable aldehydes with a polyhydric alcohol such as those disclosed above for use in the preparation of the hydroxyl polyester.

Other alcohol compounds which do not necessarily fit within any of the previously set forth classes of compounds and which nevertheless contain active hydrogen containing groups which are quite suitable for the production of the polymers of the present invention are pentaerythritol, sorbitol, triethanolamine, mannitol, N,N,N',N'-tetrakis(2-hydroxypropyl)ethylenediamine, as well as compounds of any of the classes set forth above which are substituted with halogen such as, for example, chloro, iodo, bromo and the like; nitro; alkoxy, such as, for example, methoxy, ethoxy, propoxy, butoxy and the like; carbo-alkoxy such as for example, carbomethoxy, carboethoxy and the like; dialkyl amino such as, for example, dimethylamino, diethyl amino, dipropylamino, methylethylamino and the like; mercapto, carbonyl, thiocarbonyl, phosphoryl, phosphato and the like.

Other substances which can be used include natural substances such as castor oil and the like.

The molar proportions of the diisocyanate of our invention and the compounds bearing Zerewitinoff active hydrogen atoms can vary widely. Those skilled in the art can determine the proportions of reactants best suited for a particular purpose. For example, when making polyurethane elastomers, one often uses approximately equimolar amounts of glycol and the new diisocyanate. Preferably, the active hydrogen containing compound will be used in a molar ratio to the new diisocyanate of 1:10 to 10:1.

The polymers of our invention can be prepared by reacting the new diisocyanate and the active hydrogen containing compound at subatmospheric, atmospheric or superatmospheric pressure. Atmospheric pressure is preferred. The reaction can be operated over a wide range of temperatures. Those skilled in the art will recognize that there are great differences in the relative reactivity of various groups containing active hydrogen atoms, amines reacting faster than alcohols, primary alcohols reacting faster than tertiary alcohols—to name a few examples; accordingly, one will select a temperature at which the reaction occurs at a rate convenient for the purpose at hand. Preferably, the reaction temperature ranges between about 20° and 150° C. However, the temperature is not critical.

If desired, the reaction may be carried out in an inert solvent. Representative solvents include tetrahydrofuran, o-dichlorobenzene, chlorobenzene, xylene, methyl isobutyl ketone, toluene and ethyl acetate. In general, the solvent should be free from isocyanate-reactable groups such as groups bearing Zerewitinoff-active hydrogen atoms.

In the preparation of polymers according to our invention, a portion of the new diisocyanates (i.e. up to about 90 mole % and preferably from 0 to 50 mole %) can be replaced by known polyisocyanates. Representative of such known polyisocyanates are ethylenediisocyanate, hexamethylenediisocyanate, butylene-1,3-diisocyanate, ethylidene diisocyanate, butylidene diisocyanate, 1,2,4-butanetriisocyanate, 1,3,3-pentanetriisocyanate, p-phenylene-2,2'-bis(ethylisocyanate), 1,4-naphthalene-2,2'-bis(ethylisocyanate), 5-chloro phenylene-1,3-bis(propyl-3-isocyanate), tolylene diisocyanate, m-phenylene diisocyanate, p-phenylene diisocyanate, diphenylene-4,4'-diisocyanate, xylylene-1,4-diisocyanate, 4,4'-diphenylenemethanediisocyanate and the like. A particularly desirable group of polyisocyanates to be employed in combination with our new diisocyanates in the preparation of the polymers of the invention are those described in the application of Rogier and Kamal, Serial No. 250,211, filed Jan. 9, 1963, entitled "Polyisocyanates and Derivatives." These polyisocyanates are derived from polymeric fat acids and have the following idealized structural formula:

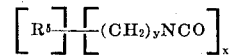

where $y$ is 0 or 1, $x$ is an integer of 2 to about 4 and $R^5$ is the hydrocarbon group of polymeric fat acids. Preferably, $x$ is 2. The polyisocyanates of the above formula wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates.

The following examples illustrate the preparation of polymers of the present invention. The said examples are not to be considered as limiting.

EXAMPLE VII

A mixture of 2.00 g. of the diisocyanate as prepared in Example I and 0.77 g. of the diketimine prepared from diethylene triamine and methylisobutyl ketone was spread on a glass plate with a three-mil drawdown bar. The coating dried to a tack-free state in about four hours at 70° F. and 50 percent relative humidity. It was of good appearance.

EXAMPLES VIII–XII

Coatings are prepared as in Example VII using the diisocyanates of Examples II–VI. Similar results are obtained. Where desired, elevated temperatures and/or catalysts such as dibutyl tin dilaurate can be used to accelerate the cure of the polymers of the invention.

It is to be understood that changes and variations may be made without departing from the spirit and scope of the invention as defined in the appended claims.

The embodiments of the invention in which an exclusive property or privilege is claimed are defined as follows:

1. A diisocyanate selected from the group consisting of

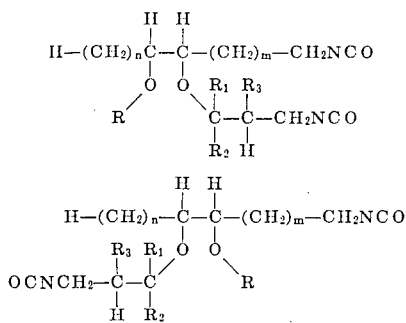

and mixtures thereof where $n$ is 4 to 19, $m$ is 0 to 15, the sum of $n$ and $m$ is 13 to 19, $R_1$, $R_2$ and $R_3$ are hydrogen or alkyl groups of one to four carbon atoms and R is a monovalent hydrocarbon radical of one to about 20 carbon atoms.

2. The diisocyanate of claim 1 wherein $R_1$, $R_2$ and $R_3$ are hydrogen.

3. The diisocyanate of claim 1 wherein the sum of $n$ and $m$ is 15.

4. The diisocyanate of claim 1 wherein $R_1$, $R_2$ and $R_3$ are hydrogen and the sum of n and m is 15.

5. The diisocyanate of claim 4 wherein $n$ is 8, $m$ is 7 and R is methyl.

6. The diisocyanate of claim 1 wherein $n$ is 8, $m$ is 7 and R is —$CH_2(CH_2)_6CH_3$.

7. The diisocyanate of claim 1 wherein $n$ is 8, $m$ is 7 and R is —$CH_2(CH_2)_{14}CH_3$.

8. The diisocyanate of claim 1 wherein $n$ is 8, $m$ is 7 and R is phenyl.

* * * * *